(12) United States Patent
Maeshima et al.

(10) Patent No.: US 10,931,180 B2
(45) Date of Patent: Feb. 23, 2021

(54) METHOD AND APPARATUS FOR MANUFACTURING ROTOR OF ELECTRIC MOTOR

(71) Applicant: Mitsubishi Electric Corporation, Tokyo (JP)

(72) Inventors: Yusuke Maeshima, Tokyo (JP); Yasumasa Takeuchi, Kikugawa (JP); Yuki Ohashi, Kikugawa (JP)

(73) Assignee: Mitsubishi Electric Corporation, Tokyo (JP)

( * ) Notice: Subject to any disclaimer, the term of this patent is extended or adjusted under 35 U.S.C. 154(b) by 275 days.

(21) Appl. No.: 15/762,186

(22) PCT Filed: Oct. 20, 2015

(86) PCT No.: PCT/JP2015/079533
§ 371 (c)(1),
(2) Date: Mar. 22, 2018

(87) PCT Pub. No.: WO2017/068639
PCT Pub. Date: Apr. 27, 2017

(65) Prior Publication Data
US 2018/0278132 A1 Sep. 27, 2018

(51) Int. Cl.
*H02K 15/03* (2006.01)
*H02K 15/16* (2006.01)
(Continued)

(52) U.S. Cl.
CPC .......... *H02K 15/03* (2013.01); *H02K 11/215* (2016.01); *H02K 15/16* (2013.01); *H02K 29/08* (2013.01);
(Continued)

(58) Field of Classification Search
CPC ...... H02K 11/215; H02K 15/03; H02K 15/16; H02K 2201/06; H02K 2211/03; H02K 2213/03
See application file for complete search history.

(56) References Cited

U.S. PATENT DOCUMENTS 5,075,814 A * 12/1991 Kubota ................. H01F 13/003
29/596
5,745,970 A * 5/1998 Sakashita ............. G11B 17/028
29/407.05
(Continued)

FOREIGN PATENT DOCUMENTS

CN 1434557 A 8/2003
EP 1863150 A2 12/2007
(Continued)

OTHER PUBLICATIONS

Office Action dated Jul. 1, 2019 issued in corresponding CN patent application No. 201580083782.2 (and English translation).
(Continued)

*Primary Examiner* — Minh N Trinh
(74) *Attorney, Agent, or Firm* — Posz Law Group, PLC

(57) ABSTRACT

A method and an apparatus for manufacturing a rotor of an electric motor are provided to obtain an electric motor with high efficiency. To this end, a rotor is magnetized by using a magnetizing device. The rotor includes a rotor magnet disposed in the circumferential direction of a rotor shaft, and a position detecting magnet disposed side-by-side with the rotor magnet with respect to the axial direction of the rotor shaft. The magnetizing device includes a rotor-magnet magnetizing yoke and a position-detecting-magnet magnetizing yoke that generate two magnetic fields. The two magnetic fields each have unlike poles arranged alternately in the circumferential direction and have a phase difference relative to each other in the circumferential direction. A phase (Continued)

(a)

difference is thus provided between the poles of the rotor magnet and the poles of the position detecting magnet.

6 Claims, 10 Drawing Sheets

(51) Int. Cl.
    *H02K 11/215*     (2016.01)
    *H02K 29/08*     (2006.01)

(52) U.S. Cl.
    CPC ...... *H02K 2201/06* (2013.01); *H02K 2211/03* (2013.01); *H02K 2213/03* (2013.01)

(56) References Cited

U.S. PATENT DOCUMENTS

| | | | |
|---|---|---|---|
| 6,903,640 B2* | 6/2005 | Carrier | H01F 13/003 |
| | | | 335/284 |
| 9,985,506 B2* | 5/2018 | Shibata | H02K 15/03 |
| 2005/0212367 A1 | 9/2005 | Blase et al. | |
| 2018/0278132 A1* | 9/2018 | Maeshima | H02K 11/215 |

FOREIGN PATENT DOCUMENTS

| | | |
|---|---|---|
| JP | 11-008960 A | 1/1999 |
| JP | 2000-324785 A | 11/2000 |
| JP | 2002-153024 A | 5/2002 |
| JP | 2003-289653 A | 10/2003 |
| JP | 2004-023800 A | 1/2004 |
| JP | 2004-120817 A | 4/2004 |
| JP | 2007-043763 A | 2/2007 |
| JP | 2008-131678 A | 6/2008 |
| JP | 2009-033851 A | 2/2009 |

OTHER PUBLICATIONS

Extended EP Search Report ("EESR") dated Jul. 13, 2017 issued in corresponding EP patent application No. 15894511.3.
International Search Report ("ISR") dated Jan. 12, 2016 issued in corresponding international patent application No. PCT/JP2015/079533.
Communication pursuant to Article 94(3) EPC dated Mar. 2, 2018 issued in corresponding EP patent application No. 15894511.3.

* cited by examiner (a)  (b)

(a)

(b)

(a)　　　　　　　　(b)　　　　　　　　(c)

(a)  (b)  (c)

(a)

(b)

(a)

(b)

METHOD AND APPARATUS FOR MANUFACTURING ROTOR OF ELECTRIC MOTOR

CROSS REFERENCE TO RELATED APPLICATION

This application is a U.S. national stage application of PCT/JP2015/079533 filed on Oct. 20, 2015, the contents of which are incorporated herein by reference.

TECHNICAL FIELD

The present invention relates to a method and an apparatus for manufacturing a rotor of an electric motor.

BACKGROUND ART

In related art, electric motors are known in which, to rotate a rotor with high efficiency, the rotor includes a magnetic-pole sensor magnet provided separately from a rotor magnet. In some cases, the sensor magnet is mounted on the rotor in such a position that its poles are displaced in phase relative to the poles of the rotor magnet. The poles of the magnets are magnetized by using a magnetizing yoke or other devices.

For example, Patent Literature 1 discloses a method that, to provide an angular difference between the poles of a field magnet and the poles of a sensor magnet, magnetizes the sensor magnet after displacing a magnetizing yoke at the time of magnetizing the sensor magnet. Further, for example, Patent Literature 2 discloses a magnetizing device having first and second rotor-magnet magnetizing yokes placed such that one is above or below the other. The magnetizing device magnetizes the sensor magnet and the rotor magnet simultaneously by supply of electric current through both the magnetizing yokes.

CITATION LIST

Patent Literature

Patent Literature 1: Japanese Unexamined Patent Application Publication No. 2004-023800
Patent Literature 2: Japanese Unexamined Patent Application Publication No. 2008-131678

SUMMARY OF INVENTION

Technical Problem

The magnetization method disclosed in Patent Literature 1 requires a step of displacing the magnetizing coil at the time of magnetizing the sensor magnet. This necessitates a mechanism for displacing the magnetizing coil, which adds complexity to the physical configuration. Another problem with this method is that adjusting the displacement of the magnetizing coil itself is difficult, leading to low accuracy with which the phase of magnetic poles is adjusted. The magnetization method disclosed in Patent Literature 2 is aimed at making the poles of the sensor magnet and the poles of the rotor magnet equal in phase with each other. As such, this magnetizing method is not applicable to manufacture of a rotor having two magnets with their poles displaced in phase relative to each other.

The present invention has been made to address the above-mentioned problems, and accordingly it is an object of the invention to provide a method and an apparatus for manufacturing a rotor of an electric motor that make it possible to manufacture a rotor of an electric motor including two magnets having a phase difference by means of a simple structure, and provide improved accuracy of phase difference adjustment.

Solution to Problem

A method for manufacturing a rotor of an electric motor of one embodiment of the present invention includes a rotor preparing step of preparing a rotor including a rotor magnet and a position detecting magnet, the rotor magnet being disposed in the circumferential direction of a rotor shaft, the position detecting magnet being disposed side-by-side with the rotor magnet with respect to the axial direction of the rotor shaft, an apparatus preparing step of preparing a magnetizing device, the magnetizing device having a space that allows the rotor to be inserted into the magnetizing device, the magnetizing device generating two magnetic fields that each have unlike poles arranged alternately in the circumferential direction and have a phase difference relative to each other in the circumferential direction, and a magnetizing step of inserting the rotor into the space of the magnetizing device, and magnetizing the rotor magnet by one of the two magnetic fields and magnetizing the position detecting magnet by the other one of the two magnetic fields.

A method for manufacturing a rotor of an electric motor of one embodiment of the present invention includes a rotor preparing step of preparing a rotor including a rotor magnet and a position detecting magnet, of which only the rotor magnet is oriented in polarity, the rotor magnet being disposed in the circumferential direction of a rotor shaft, the position detecting magnet being disposed side-by-side with the rotor magnet with respect to the axial direction of the rotor shaft, an apparatus preparing step of preparing a magnetizing device, the magnetizing device having a space that allows the rotor to be inserted into the magnetizing device, the magnetizing device generating two magnetic fields that each have unlike poles arranged alternately in the circumferential direction and are equal in phase with each other in the circumferential direction, and a magnetizing step of inserting the rotor into the space of the magnetizing device with a phase difference being provided between the oriented polarity of the rotor magnet and a magnetic field generated by the magnetizing device, the rotor magnet being magnetized by one of the two magnetic fields, the position detecting magnet being magnetized by the other one of the two magnetic fields.

An apparatus for manufacturing a rotor of an electric motor of one embodiment of the present invention is an apparatus for manufacturing a rotor of an electric motor, the rotor including a rotor magnet and a position detecting magnet, the rotor magnet being disposed in the circumferential direction of a rotor shaft, the position detecting magnet being disposed side-by-side with the rotor magnet with respect to the axial direction of the rotor shaft, the apparatus including two magnetizing yokes that each generate a magnetic field with unlike poles alternating in the circumferential direction. One of the two magnetizing yokes has a space in the shape of a cylinder. The other one of the two magnetizing yokes is disposed near one axial end portion of the cylinder of the one magnetizing yoke. A magnetic field generated by the one magnetizing yoke and a magnetic field generated by the other magnetizing yoke have a phase difference relative to each other in the circumferential direction.

Advantageous Effects of Invention

The method and apparatus for manufacturing a rotor of an electric motor according to the present invention make it possible to manufacture a rotor including two magnets that have a phase difference by means of a simple structure, and improve the accuracy of phase difference adjustment.

DESCRIPTION OF EMBODIMENTS

Embodiment 1

Figure 1:
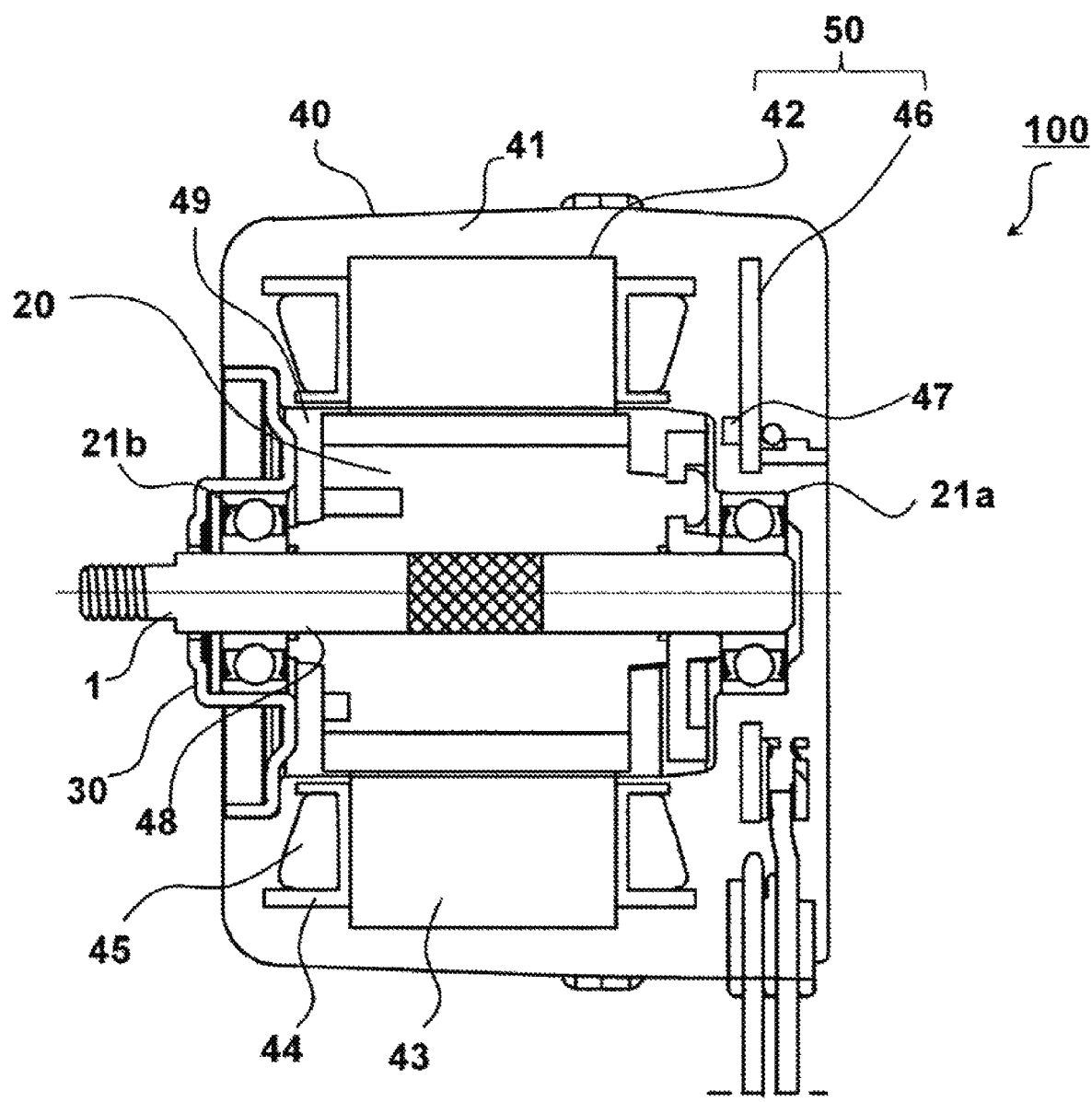
FIG. 1 is a cross-sectional view illustrating the configuration of an electric motor including a rotor manufactured by a method and an apparatus for manufacturing a rotor of an electric motor according to Embodiment 1.

FIG. 1 is a cross-sectional view illustrating the configuration of an electric motor 100 including a rotor 20 manufactured by a method and an apparatus for manufacturing a rotor of an electric motor according to Embodiment 1. FIG. 2(a) is a perspective view of a stator assembly 50 with a board 46 attached to a stator 20 illustrated in FIG. 1, as seen from the front side of the board 46. FIG. 2(b) is a plan view of the stator assembly 50 illustrated in FIG. 2(a) as seen from the back side of the board 46. FIG. 3(a) is a plan view of the board 46 illustrated in FIG. 2(a) as seen from its front side. FIG. 3(b) is a plan view of the board 46 illustrated in FIG. 3(a) as seen from its back side.

Figure 2:
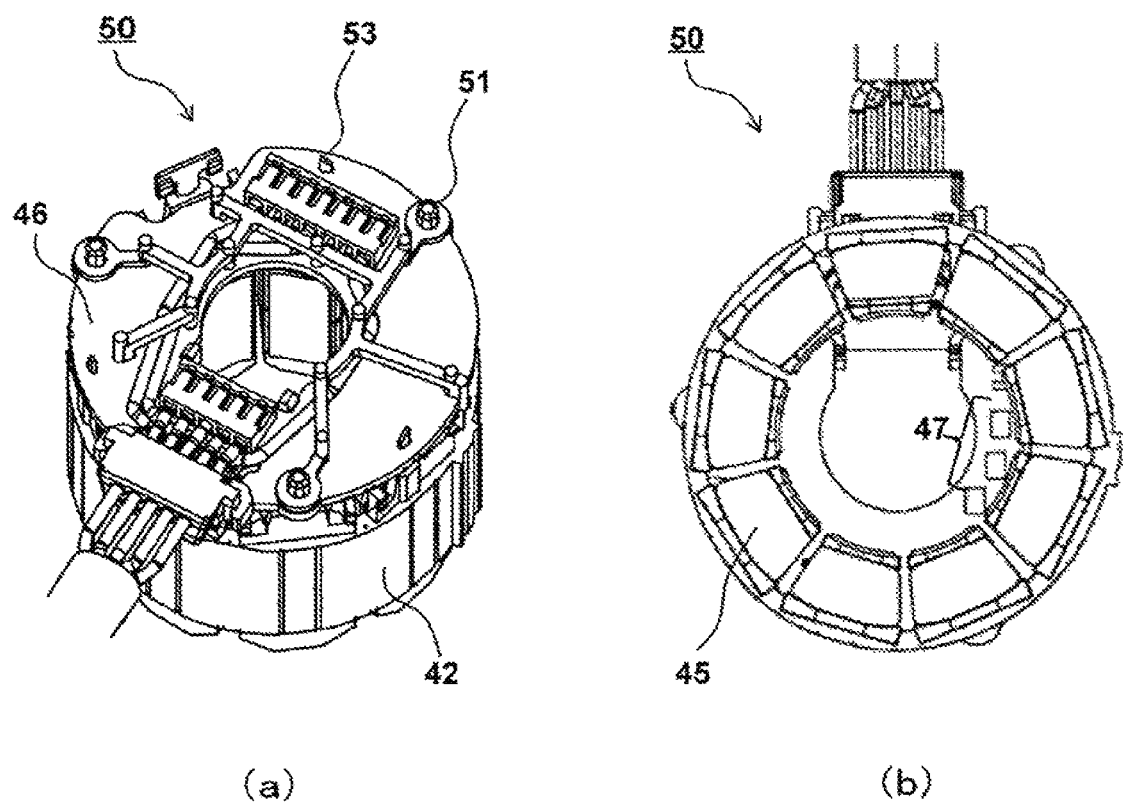
FIG. 2(a) is a perspective view of a stator assembly with a board attached to a stator illustrated in FIG. 1 as seen from the front side of the board.
FIG. 2(b) is a plan view of the stator assembly illustrated in FIG. 2(a) as seen from the back side of the board.
Figure 3:
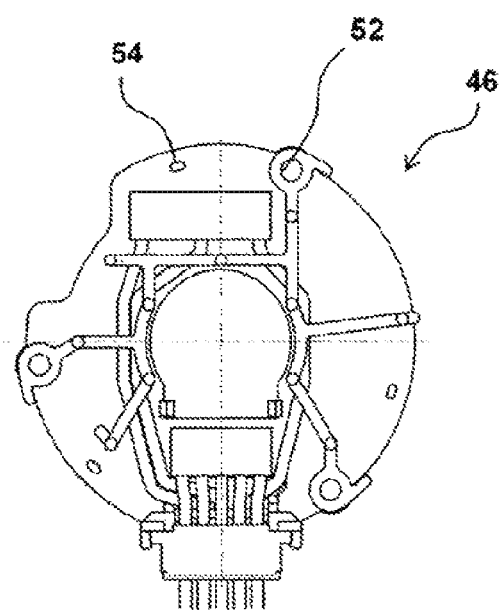
FIG. 3(a) is a plan view of the board illustrated in FIG. 2(a) as seen from its front side.
FIG. 3(b) is a plan view of the board illustrated in FIG. 3(a) as seen from its back side.
Figure 3:
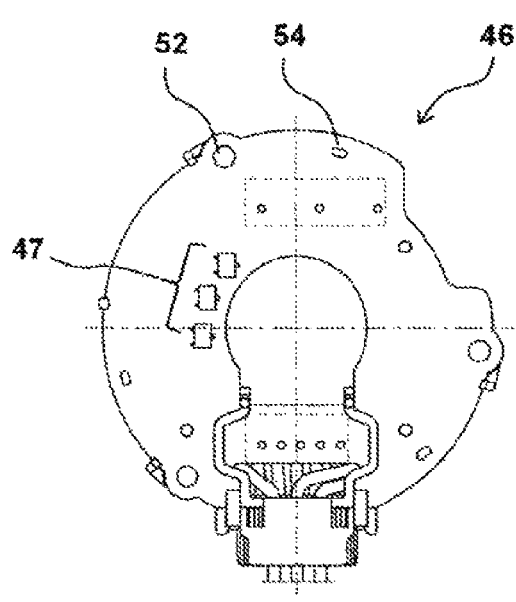

As illustrated in FIGS. 1 to 3, the electric motor 100 includes a molded stator 40, the rotor 20 disposed inside the molded stator 40, and a bracket 30 made of metal attached to one axial end portion of the molded stator 40. The electric motor 100 is, for example, a brushless DC motor. The molded stator 40 includes a stator 42, the stator assembly 50 with the board 46 mounted on the stator 42, and a molding resin part 41 that covers the stator assembly 50. The molded stator 40 is formed by embedding the stator assembly 50 in molding resin, which is the material of the molding resin part 41.

The stator 42 includes a stator core 43 made up of laminated magnetic steel sheets, an insulation 44 applied to the stator core 43, and coils 45 wound on the insulation 44. In the stator 42, the coils 45 are arranged in an annular fashion. The insulation 44 is molded integrally with the stator core 43 from thermoplastic resin, or is a separate molded part of thermoplastic resin attached to the stator core 43. The insulation 44 is provided with a plurality of protrusions 51 used for mounting the board 46. The board 46 is mounted by deforming the protrusions 51 by heat welding or other methods. The insulation 44 is provided with a plurality of terminals 53 each electrically connected with a winding. The terminals 53 are inserted into corresponding terminal insertion holes 54 of the board 46, and then soldered to be electrically connected to the board 46.

The board 46 has a plurality of holes 52 that fit onto the corresponding protrusions 51 of the insulation 44. The protrusions 51 of the insulation 44 are inserted into the corresponding holes 52. The protrusions 51 of the insulation 44 are deformed by heat welding or other methods and attached to the insulation 44. The board 46 is also provided with the terminal insertion holes 54 that fit onto the corresponding terminals 53 of the insulation 44. The terminals 53 are inserted into the corresponding terminal insertion holes 54, and then soldered to be electrically connected to the board 46. A magnetic detection element 47 is mounted on the board 46. The magnetic detection element 47 constitutes a sensor circuit that detects the position of the rotor 20. The magnetic detection element 47 is disposed opposite a position detecting magnet 11 illustrated in FIG. 5, and detects the magnetism generated by the position detecting magnet 11 to detect the position of the rotor 20. If the electric motor 100 is a brushless DC motor, for the electric motor 100, a driving circuit (not illustrated) is provided outside the electric motor 100 or in the board 46. The driving circuit controls passage of current through the coils 45 in accordance with the position of a rotor magnet 10 of the rotor 20 relative to the stator 42. This allows the electric motor 100 to be driven with high efficiency and low noise.

A rotor shaft 1 is provided integrally with the rotor 20. That is, the rotor shaft 1 is passed through a shaft hole 48 of the rotor 20. A pair of bearings 21a and 21b is attached to the rotor shaft 1. The rotor 20 with the bearings 21a and 21b attached is inserted into a hollow part 49 provided in the molded stator 40. The bearing 21a is disposed at the side where the board 46 is located, and the bearing 21b is disposed at the side where the bracket 30 is located. The side where the bracket 30 is located corresponds to the load side, and thus the bearing 21b is disposed at the load side of the electric motor 100 and supported by the bracket 30. The bearing 21a is disposed at the counter-load side of the electric motor 100 and supported by the molding resin part 41. The load side refers to the distal end side of the rotor shaft 1 projecting from the molded stator 40, and the counter-load side refers to the side opposite to the load side.

Figure 4:
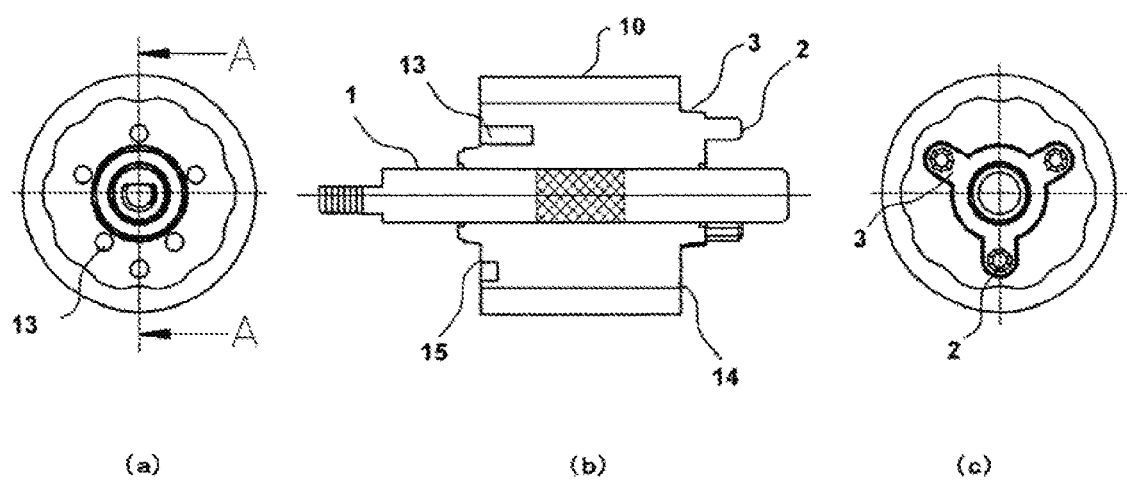
FIG. 4(a) is a plan view of a rotor shaft and a rotor magnet as seen from one axial end of the rotor shaft.
FIG. 4(b) is a cross-sectional view of the rotor shaft and the rotor magnet taken along a line A-A in FIG. 4(a)
FIG. 4(c) is a plan view of the rotor shaft and the rotor magnet as seen from the other axial end of the rotor shaft.
Figure 5:
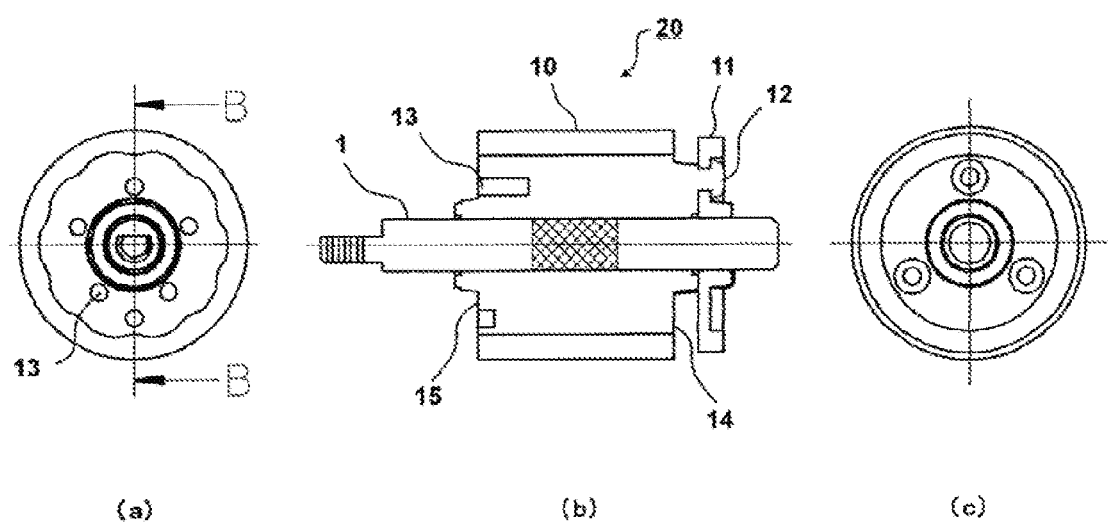
FIG. 5(a) is a plan view of the rotor as seen from the side opposite to the side on which a position detecting magnet is mounted.
FIG. 5(b) is a cross-sectional view of the rotor taken along a line B-B in FIG. 5(a)
FIG. 5(c) is a plan view of the rotor as seen from the side on which the position detecting magnet is mounted.

FIG. 4(*a*) is a plan view of the rotor shaft 1 and a rotor magnet 10 as seen from one axial end of the rotor shaft 1. FIG. 4(*b*) is a cross-sectional view of the rotor shaft 1 and the rotor magnet 10 taken along a line A-A in FIG. 4(*a*). FIG. 4(*c*) is a plan view of the rotor shaft 1 and the rotor magnet 10 as seen from the other axial end of the rotor shaft 1. FIG. 5(*a*) is a plan view of the rotor 20 as seen from the side opposite to the side on which the position detecting magnet 11 is mounted. FIG. 5(*b*) is a cross-sectional view of the rotor 20 taken along a line B-B in FIG. 5(*a*). FIG. 5(*c*) is a plan view of the rotor 20 as seen from the side on which the position detecting magnet 11 is mounted.

As illustrated in FIGS. 4 and 5, the rotor 20 includes the rotor shaft 1, the rotor magnet 10 disposed coaxially on the outer circumference of the rotor shaft 1 and having a first end face 14 and a second end face 15 that are located opposite each other with respect to the axial direction, the rotor magnet 10 being formed by molding of a molding material, and the position detecting magnet 11 disposed coaxially with the rotor shaft 1 and attached to one end portion of the rotor magnet 10 with respect to the axial direction of the rotor shaft 1. Hereinafter, the axial direction of the rotor shaft 1 will be referred to simply as "axial direction". The axial direction of the rotor shaft 1 is the axial direction of the rotor magnet 10, and is also the axial direction of the position detecting magnet 11. The rotor magnet 10 is disposed in the circumferential direction of the rotor shaft. The position detecting magnet 11 is disposed side-by-side with the rotor magnet 10 with respect to the axial direction of the rotor shaft 1.

The rotor magnet 10 is oriented in polarity such that the N- and S-poles alternate in the circumferential direction. By contrast, the position detecting magnet 11 is not oriented in polarity. The first end face 14, which is one axial end face of the rotor magnet 10, has a plurality of seats 3. The position detecting magnet 11 is placed on the seats 3. That is, the position detecting magnet 11 abuts on the seats 3. Each of the seats 3 is provided with a protrusion 2. Each of the protrusions 2 is passed through a hole 15 provided in the position detecting magnet 11. The distal end portion of the protrusion 2 is heat-welded to form a heat welding part 12. This allows for easy positioning and securing of the position detecting magnet 11 relative to the rotor magnet 10. A recess 13 can be used for the purpose of positioning in the magnetization process of the rotor magnet 10. That is, the recess 13 can be used for aligning the rotor magnet 10 with a magnetizing yoke 60 at the time of inserting the rotor magnet 10 into the magnetizing yoke 60. This improves and stabilizes the accuracy of magnetization, allowing for improved performance of the electric motor 100.

To drive the electric motor 100 with high efficiency and low noise, it is necessary to reduce the error in detecting the position of the rotor 20. The accuracy of detection of the circumferential position of the rotor 20 by the magnetic detection element 47 is affected by manufacturing variations in the mounting position of the magnetic detection element 47 on the board 46. That is, displacement of the magnetic detection element 47 relative to the stator 42 causes an error in the detected position of the rotor 20. Since the magnetic detection element 47 is subject to a displacement that varies with the accuracy of the mounting equipment, it is difficult to improve the accuracy of the mounting position of the magnetic detection element 47. Accordingly, this problem is addressed by employing an approach that involves providing a phase difference between the poles of the rotor magnet 10 and the poles of the position detecting magnet 11, and then improving the accuracy with which this phase difference is adjusted. That is, the poles of the rotor magnet 10 and the poles of the position detecting magnet 11 on the rotor 20 are displaced in phase relative to each other in a direction that cancels an error in detecting the position of the rotor 20 that results from displacement of the magnetic detection element 47 relative to the stator 42, thus absorbing the error in detecting the position of the rotor 20. For example, the molded stator 40 with an error in the positive rotational direction (plus direction) is combined with the rotor 20 with an error (phase difference) in the negative rotational direction (minus direction) to cancel out and correct the errors of the molded stator 40 and the rotor 20, thus absorbing the error in detecting the position of the rotor 20.

An error measurement step of measuring the error mentioned above will be described below.

First, the rotor 20 used for error measurement is prepared. The rotor 20 includes the rotor magnet 10, and the position detecting magnet 11 disposed on the rotor shaft 1 side-by-side with the rotor magnet 10 (error-measurement-rotor preparing step). The poles of the rotor magnet 10 and the poles of the position detecting magnet 11 on the rotor 20 are equal in phase with each other.

Next, the molded stator 40 is prepared by embedding, in the molding resin, the stator 42 with the coils 45 arranged in an annular fashion, and the board 46 on which the magnetic detection element 47 is mounted to detect magnetism (molded-stator preparing step).

Next, the rotor 20 is inserted into the stator 42 and combined with the molded stator 40 to temporarily assemble the electric motor 100. Then, with the rotor 20 being rotated by an external force, the poles of the position detecting magnet 10 are detected, and the voltage induced in the coils 45 of the stator 20 is detected (detecting step).

Next, the waveform of the voltage induced in the coils 45 and the waveform of the output of the magnetic detection element 47 are observed and compared to measure the error of position detection (error measurement step). In the measurement, for example, the error is detected as the difference between the position at which the poles switch between positive and negative, and the position at which the induced voltage switches between positive and negative. The position at which the poles switch between positive and negative can be determined from, for example, the position of the rising or falling edge of the output waveform of the magnetic detection element 47. The position at which the induced voltage switches between positive and negative can be determined from, for example, the position of the boundary between positive and negative values (ground level) of the induced-voltage waveform. This error reflects the amount of displacement of the magnetic detection element 47 on the board 46 included in the molded stator 40 that is used in the error measurement step.

Figure 6:
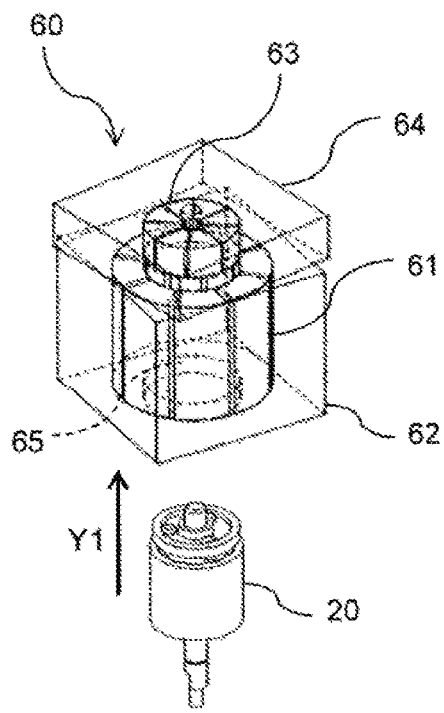
FIG. 6(a) is a perspective view of an exemplary magnetizing device and a rotor according to Embodiment 1.
FIG. 6(b) is a perspective view of another exemplary magnetizing device and the rotor according to Embodiment 1.
Figure 6:
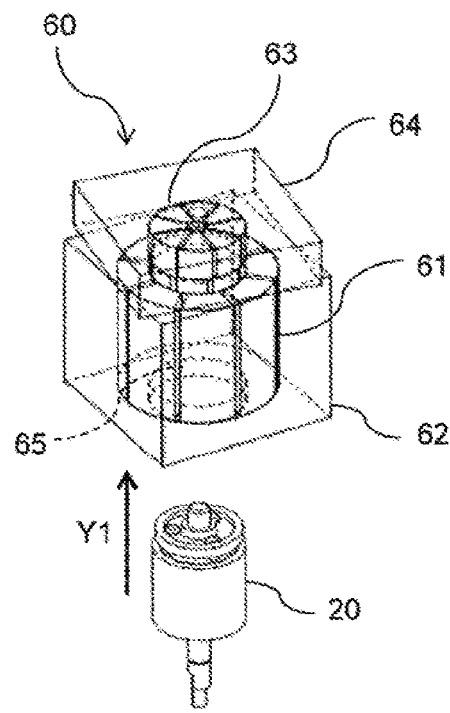

FIG. 6(*a*) is a perspective view of an example of the magnetizing device 60 and the rotor 20 according to Embodiment 1. FIG. 6(*b*) is a perspective view of another example of the magnetizing device 60 and the rotor 20 according to Embodiment 1. Referring to FIG. 6(*a*) and FIG. 6(*b*), the step of magnetizing the rotor 20 to absorb the amount of displacement of the magnetic detection element 47 mentioned above will be described below.

First, the rotor 20 is prepared (rotor preparing step). The rotor 20 includes the rotor magnet 10 disposed in the circumferential direction of the rotor shaft 1, and the position detecting magnet 11 disposed on the rotor shaft 1 side-by-side with the rotor magnet 10.

Next, the magnetizing device 60 is prepared (apparatus preparing step). The magnetizing device 60 has a space 65 into which the rotor 20 can be inserted. The magnetizing device 60 has a rotor-magnet magnetizing yoke 62 and a position-detecting-magnet magnetizing yoke 64. The rotor-magnet magnetizing yoke 62 includes a rotor-magnet magnetizing coil 61 that generates a magnetic field for magnetizing the rotor magnet 10. The position-detecting-magnet magnetizing yoke 64 includes a position-detecting-magnet magnetizing coil 63 that generates a magnetic field for magnetizing the position detecting magnet 11. Each of the rotor-magnet magnetizing yoke 62 and the position-detecting-magnet magnetizing yoke 64 generates a magnetic field in which unlike poles are arranged alternately in the circumferential direction. The position-detecting-magnet magnetizing yoke 64 is fixed in a position circumferentially displaced relative to the rotor-magnet magnetizing yoke 62. This configuration causes the poles of the rotor-magnet magnetizing yoke 62 and the poles of the position-detecting-magnet magnetizing yoke 64 to be displaced in phase relative to each other in the circumferential direction. This allows the magnetizing device 60 to generate two magnetic fields that each have unlike poles arranged alternately in the circumferential direction and have a phase difference relative to each other in the circumferential direction. The amount of circumferential displacement of the position-detecting-magnet magnetizing yoke 64 is based on the error (phase difference) measured in the error measurement step. If the standard rotor 20 used in the error measurement step is a reference rotor in which the respective poles of the rotor magnet 10 and the position detecting magnet 11 are equal in phase with each other, an error obtained by the measurement can be set as the amount of circumferential displacement. The direction of rotation of the position-detecting-magnet magnetizing yoke 64 is the direction that cancels out this error.

Next, the rotor 20 is moved as indicated by an arrow Y1 illustrated in FIG. 6 (a) and FIG. 6(b) to insert the rotor 20 into the space 65 of the magnetizing device 60. The magnetizing device 60 is energized with the rotor 20 being inserted in the magnetizing device 60. As a result, the rotor magnet 10 is magnetized by the magnetic field of the rotor-magnet magnetizing yoke 62, and the position detecting magnet 11 is magnetized by the magnetic field of the position-detecting-magnet magnetizing yoke 64 (magnetizing step).

If the rotor 20 used is such that the rotor magnet 10 is oriented in polarity in advance and the position detecting magnet 11 is not oriented in polarity, the rotor magnet 10 is magnetized in accordance with the oriented polarity of the rotor magnet 10, and the position detecting magnet 11 is magnetized in accordance with the phase of the position-detecting-magnet magnetizing yoke 64. When the rotor 20 configured as described above is to be inserted into the magnetizing device 60, the rotor 20 can be inserted into the magnetizing device 60 such that the oriented polarity of the rotor magnet 10 and the poles of the rotor-magnet magnetizing yoke 62 are aligned with each other. With the rotor 20 inserted in this way, the phase difference between the poles of the rotor magnet 10 and the poles of the position detecting magnet 11 becomes equal to the phase difference between the poles of the rotor-magnet magnetizing yoke 62 and the poles of the position-detecting-magnet magnetizing yoke 64. This makes it possible to absorb all of the error obtained by measurement in the error measurement step.

When the rotor 20 having the rotor magnet 10 and the position detecting magnet 11 that are not oriented in polarity is to be inserted into the magnetizing device 60, there is no need to adjust the angle of insertion. The rotor magnet 10 is magnetized in accordance with the phase of the poles of the rotor-magnet magnetizing yoke 62, and the position detecting magnet 11 is magnetized in accordance with the phase of the position-detecting-magnet magnetizing yoke 64. As a result, the phase difference between the poles of the rotor magnet 10 and the poles of the position detecting magnet 11 becomes equal to the phase difference between the poles of the rotor-magnet magnetizing yoke 62 and the poles of the position-detecting-magnet magnetizing yoke 64. This makes it possible to absorb all of the error obtained by measurement in the error measurement step.

Figure 7:
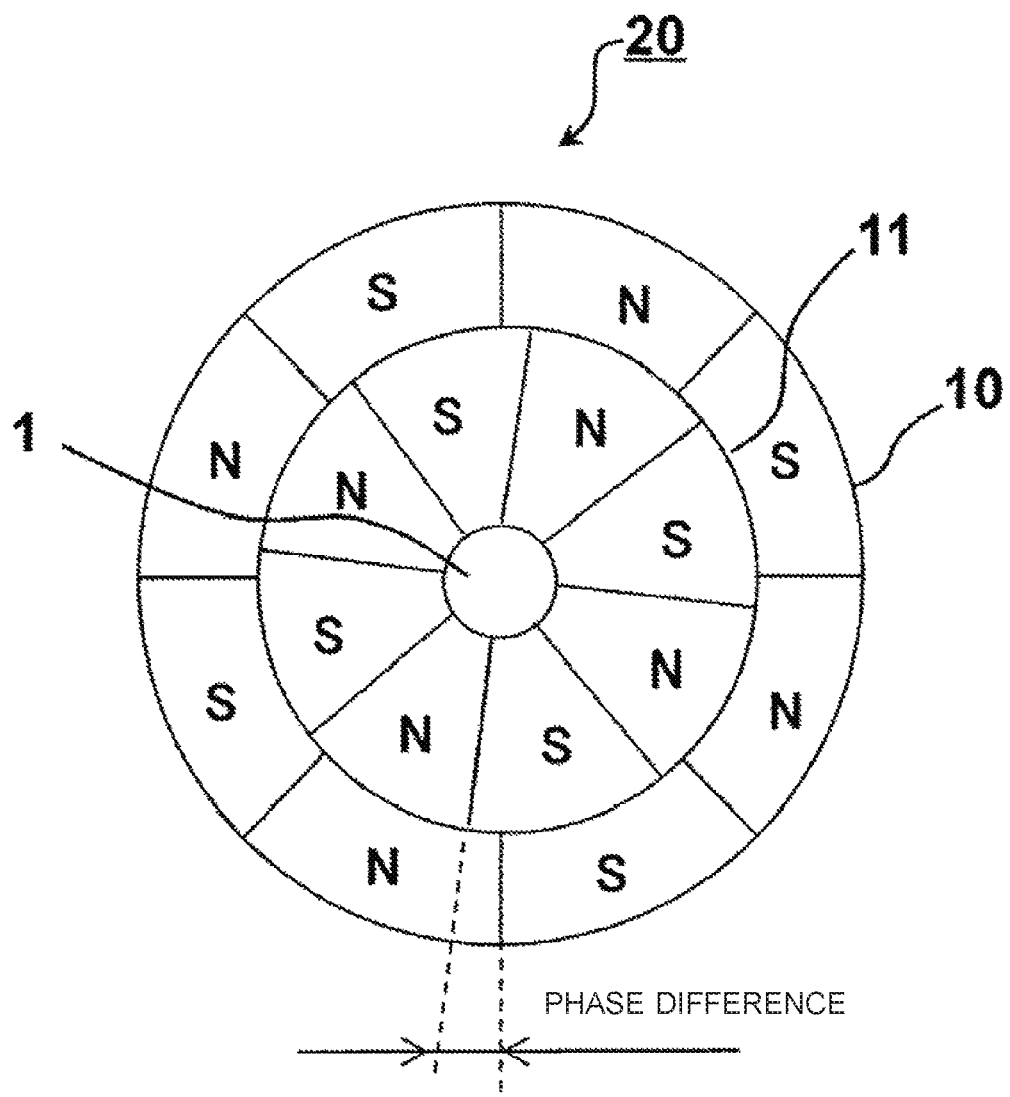
FIG. 7 schematically illustrates the distribution of magnetization of the rotor magnetized by the magnetizing device illustrated in FIG. 6.

FIG. 7 schematically illustrates the distribution of magnetization of the rotor 20 magnetized by the magnetizing device 60. The rotor magnet 10 is located near the outer periphery of the rotor 20, with its N- and S-poles being alternately magnetized in the circumferential direction. The position detecting magnet 11 is located near the end face of the board 46, with its N- and S-poles being alternately magnetized in the circumferential direction. The position where the N- and S-poles of the rotor magnet 10 switch (to be referred to as interpolar position hereinafter), and the interpolar position of the position detecting magnet 11 are displaced relative to each other in the circumferential direction. The amount of this circumferential displacement is equal to the amount of error obtained in the error measurement step. The direction of displacement is the direction that cancels out this error.

As described above, in Embodiment 1, the rotor 20 is magnetized by using the magnetizing device 60 in which the poles of the rotor-magnet magnetizing yoke 62 and the poles of the position-detecting-magnet magnetizing yoke 64 are displaced in phase relative to each other in the circumferential direction. This allows the poles of the rotor magnet 10 and the poles of the position detecting magnet 11 to be magnetized with a phase difference therebetween. In Embodiment 1, the magnitude of this phase difference can be made equal to the magnitude of the error measured in the error measurement step, and thus the direction of this displacement can be used as the direction for absorbing this error. Therefore, the electric motor 100 including the rotor 20 manufactured by the manufacturing method and the manufacturing apparatus according to Embodiment 1 makes it possible to correct/absorb the error in the position of the rotor 20 detected by the magnetic detection element 47, even if the magnetic detection element 47 is mounted at a displaced position on the board 46.

Unlike Embodiment 1, manufacturing methods that adjust phase by rotating the rotor 20 suffer from low accuracy of phase adjustment using such rotation, which also leads to reduced accuracy of phase error correction. By contrast, in Embodiment 1 the magnetizing device 60 including two magnetizing yokes that are fixed in positions and generate two magnetic fields with a phase difference in the circumferential direction is used. As a result, the rotor 20 with magnetic poles having a phase difference can be manufactured without rotating the rotor 20. This improves the accuracy with which the magnetic poles are adjusted in phase, resulting in improved accuracy of correction.

Embodiment 1 allows use of the rotor 20 including the rotor magnet 10 and the position detecting magnet 11 that are not oriented in polarity. Using the rotor 20 that is not oriented in polarity allows a predetermined phase difference to be provided between the poles of the rotor magnet 10 and the poles of the position detecting magnet 11 without adjusting the circumferential rotational position of the rotor 20 inserted into the magnetizing device 60. The manufacturing method and the manufacturing apparatus according to Embodiment 1 allows for improved accuracy of error correction and shorter manufacturing time in comparison to manufacturing methods that magnetize the rotor 20 after positioning the rotor magnet with respect to the circumferential direction.

In Embodiment 1, the magnetic field of the rotor-magnet magnetizing yoke 62 and the magnetic field of the position-detecting-magnet magnetizing yoke 64 can be generated simultaneously. This allows the rotor magnet 10 and the position detecting magnet 11 to be magnetized simultaneously. As a result, the magnetization time for the rotor 20 can be shortened.

The error measurement step may use, as a reference rotor, a rotor in which the poles of the rotor magnet and the poles of the position detecting magnet are equal in phase with each other. In this case, the measurement error can be used as the amount of circumferential displacement (amount of correction) as it is. This enables easy adjustment of the phase difference between the poles of the rotor-magnet magnetizing yoke 62 and the poles of the position-detecting-magnet magnetizing yoke 64.

The electric motor 100 including the rotor 20 manufactured by the method for manufacturing a rotor of an electric motor according to Embodiment 1 makes it possible to absorb the error due to displacement of the rotor 20 relative to the stator 20 of the molded stator 40, thus detecting the position of the rotor 20 with accuracy. As a result, the electric motor 100 can be driven with high efficiency and low noise.

In the error measurement step, a rotor in which the poles of the rotor magnet 10 and the poles of the position detecting magnet 11 have a known phase difference may also be used as the rotor 20 for error detection. In this case, in the magnetizing step, the magnetizing device 60 in which the position-detecting-magnet magnetizing yoke 64 is rotated in a direction that cancels out the measurement error obtained in the error measurement step, and is further rotated in a direction that cancels out the known phase difference and fixed in the rotated position is used. As in the above-mentioned example, each of the rotor magnet 10 and the position detecting magnet 11 is thus magnetized in a position displaced by an amount that cancels out the measurement error. In Embodiment 1, the reference-rotor preparing step and the component preparing step may be switched in their order, in which case the same effect as mentioned above can be also obtained. Further, in Embodiment 1, the rotor preparing step and the apparatus preparing step may be switched in their order, in which case the same effect as mentioned above can be also obtained.

Embodiment 2

Figure 8:
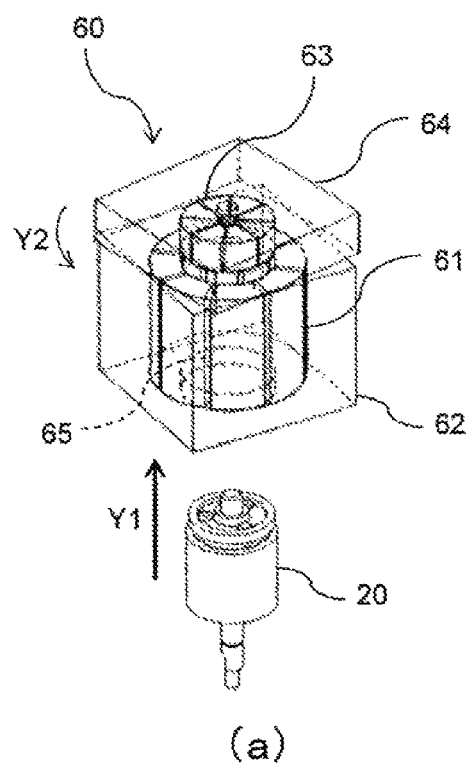
FIG. 8(a) is a perspective view of an exemplary magnetizing device and a rotor according to Embodiment 2.
FIG. 8(b) is a perspective view of another exemplary magnetizing device and the rotor according to Embodiment 1.
Figure 8:
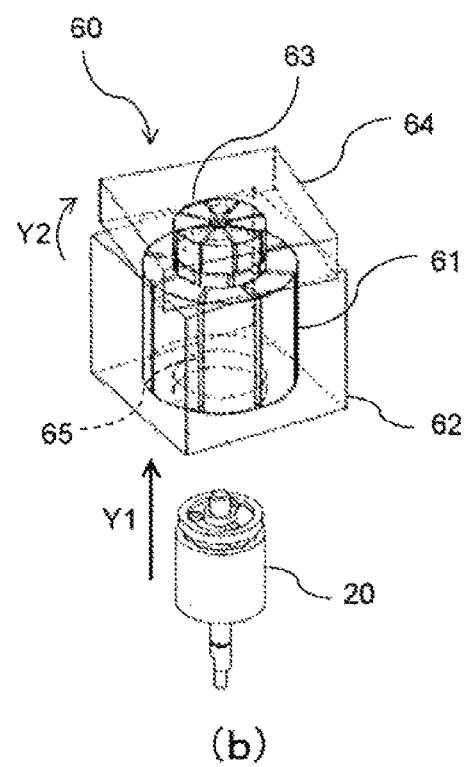

FIG. 8(a) is a perspective view of an example of the magnetizing device 60 and the rotor 20 according to Embodiment 2. FIG. 8(b) is a perspective view of another example of the magnetizing device 60 and the rotor 20 according to Embodiment 2. In the magnetizing device 60 according to Embodiment 1, the poles of the rotor-magnet magnetizing yoke 62 and the poles of the position-detecting-magnet magnetizing yoke 64 are fixed in positions displaced relative to each other in the circumferential direction. By contrast, in the magnetizing device 60 according to Embodiment 2, the rotor-magnet magnetizing yoke 62 is rotatable in the direction of an arrow Y2 illustrated in FIG. 8(a) and FIG. 8(b). The step of rotating the rotor-magnet magnetizing yoke 62 (phase-difference changing step) is performed between the apparatus preparing step and the magnetizing step according to Embodiment 1. The rotor-magnet magnetizing yoke 62 can be rotated either manually or by a rotational drive unit (not illustrated). The direction and amount of rotation can be determined based on the error obtained by measurement in the error measurement step.

If a rotational drive unit is used, correction data indicative of the direction and amount of rotation required for error correction is input to the rotational drive unit. For example, the correction data is input to an input terminal (not illustrated) by the user, and transmitted to the rotational drive unit from the input terminal. In an alternative configuration, for example, the magnetizing device 60 is provided with a communication unit (not illustrated), and correction data based on the error measured in the error measurement step is transmitted from the communication unit to the rotational drive unit prior to proceeding to the magnetizing step. The rotational drive unit rotates the rotor-magnet magnetizing yoke 62 in the rotational direction indicated by the input correction data and by an amount indicated by the correction data, and fixes the rotor-magnet magnetizing yoke 62 in that position. The provision of the rotational drive unit mentioned above makes it possible to easily change the position of the rotor-magnet magnetizing yoke 62 in the circumferential direction. For manual error correction, the rotor-magnet magnetizing yoke 62 is first rotated manually by an amount corresponding to the error measured in the error measurement step, and then fixed in that position. The magnetizing device 60 whose position has been thus changed is illustrated in, for example, FIG. 8(a) and FIG. 8(b).

Embodiment 2 eliminates the need to prepare a plurality of magnetizing devicees 60 according to Embodiment 1 as illustrated in FIG. 6(a) and FIG. 6(b) assembled by fixing the rotor-magnet magnetizing yoke 62 and the position-detecting-magnet magnetizing yoke 64 in positions circumferentially displaced relative to each other in advance. That is, a single magnetizing device 60 can be used to magnetize the rotor 20 with a phase difference corresponding to the measurement error being provided between the respective poles of the rotor magnet 10 and the position detecting magnet 11 of the rotor 20. Since only a single magnetizing device 60 is required, manufacturing cost can be reduced. The electric motor 100 including the rotor 20 manufactured by the method for manufacturing a rotor of an electric motor according to Embodiment 1 makes it possible to absorb the error due to displacement of the rotor 20 relative to the stator 20 of the molded stator 40, thus detecting the position of the rotor 20 with accuracy. As a result, the electric motor 100 can be driven with high efficiency and low noise.

Embodiment 3

Figure 9:
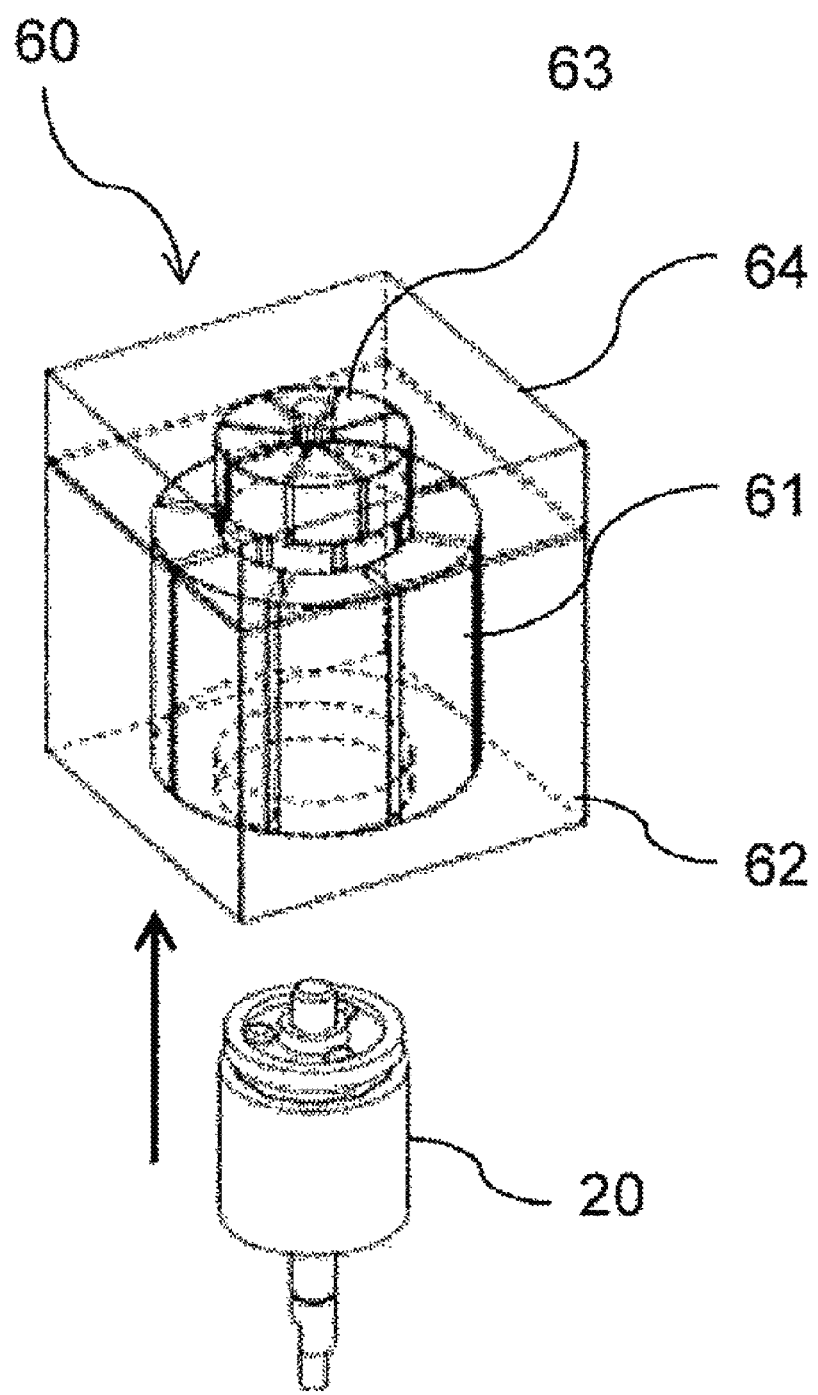
FIG. 9 is a perspective view of a magnetizing device and a rotor according to Embodiment 3.

FIG. 9 is a perspective view of the magnetizing device 60 and the rotor 20 according to Embodiment 3. In the magnetizing device 60 according to Embodiment 3, the poles of the rotor-magnet magnetizing yoke 62, and the poles of the position-detecting-magnet magnetizing yoke 64 are equal in phase with each other in the circumferential direction. The rotor-magnet magnetizing yoke 62 includes the rotor-magnet magnetizing coil 61 that generates a magnetic field for magnetizing the rotor magnet 10. The position-detecting-magnet magnetizing yoke 64 includes the position-detecting-magnet magnetizing coil 63 that generates a magnetic field for magnetizing the position detecting magnet 11.

An error measurement step according to Embodiment 3 is the same as that according to Embodiment 1. A magnetizing step according to Embodiment 3 will be described below.

First, the rotor 20 is prepared (rotor preparing step). The rotor 20 includes the rotor magnet 10 disposed in the circumferential direction of the rotor shaft 1, and the position detecting magnet 11 disposed on the rotor shaft 1 side-by-side with the rotor magnet 10. The rotor magnet 10 is oriented in polarity in advance during its molding. The position detecting magnet 11 is not oriented in polarity in advance during its molding.

Next, the magnetizing device 60 is prepared (apparatus preparing step). The magnetizing device 60 has the space 65 into which the rotor 20 can be inserted. The magnetizing device 60 is able to generate two magnetic fields that are equal in phase with each other in the circumferential direction by use of the rotor-magnet magnetizing yoke 62 and the position-detecting-magnet magnetizing yoke 64.

Next, the rotor 20 is inserted into the magnetizing device 60. At this time, the rotor 20 is inserted into the magnetizing device 60 in such a position that the phase of the oriented polarity of the rotor magnet 10 and the phase of the magnetic field generated by the magnetizing device 60 are displaced relative to each other in the circumferential direction. The difference between the two phases can be set to a value equal to the error measured in the error measurement step. The direction of rotation of the rotor magnet 10 is the direction that cancels out this error. The rotor 20 inserted in the magnetizing device 60 is fixed in that position until magnetization is complete.

Next, the rotor magnet 10 is magnetized by the magnetic field of the rotor-magnet magnetizing yoke 62, and the position detecting magnet 11 is magnetized by the magnetic field of the position-detecting-magnet magnetizing yoke 64. Although the rotor magnet 10 is subjected to a magnetizing field displaced from the polarity orientation of the rotor magnet 10, the rotor magnet 10 is magnetized in accordance with the oriented polarity of the rotor magnet 10. Since the position detecting magnet 11 is not oriented in polarity, the position detecting magnet 11 is magnetized in accordance with the phase of the position-detecting-magnet magnetizing yoke 64. This creates a phase difference between the poles of the rotor magnet 10 and the poles of the position detecting magnet 11.

The following methods may be employed to set the circumferential angle at which the rotor 20 is inserted into the magnetizing device 60. One example method uses a plurality of holders (not illustrated) that hold the rotor 20 at different circumferential angles. With this method, the holder currently holding the rotor 20 is changed to another holder that is selected in accordance with the measurement error of the molded stator 40 and holds the rotor 20 at a different circumferential angle, and the rotor 20 is held by the other holder at this circumferential angle. This allows the rotor 20 to be held at an optimal circumferential angle according to the measurement error throughout the magnetization period.

Another method uses a positioning mechanism (not illustrated) for determining the circumferential position of the holder for the rotor 20. With this method, the angle of rotation in the circumferential direction is determined in accordance with the measurement error of the molded stator 40, and the rotor 20 is rotated by this angle and fixed in that position by the positioning mechanism. This allows the rotor 20 to be changed in circumferential angle and held at that angle.

Figure 10:
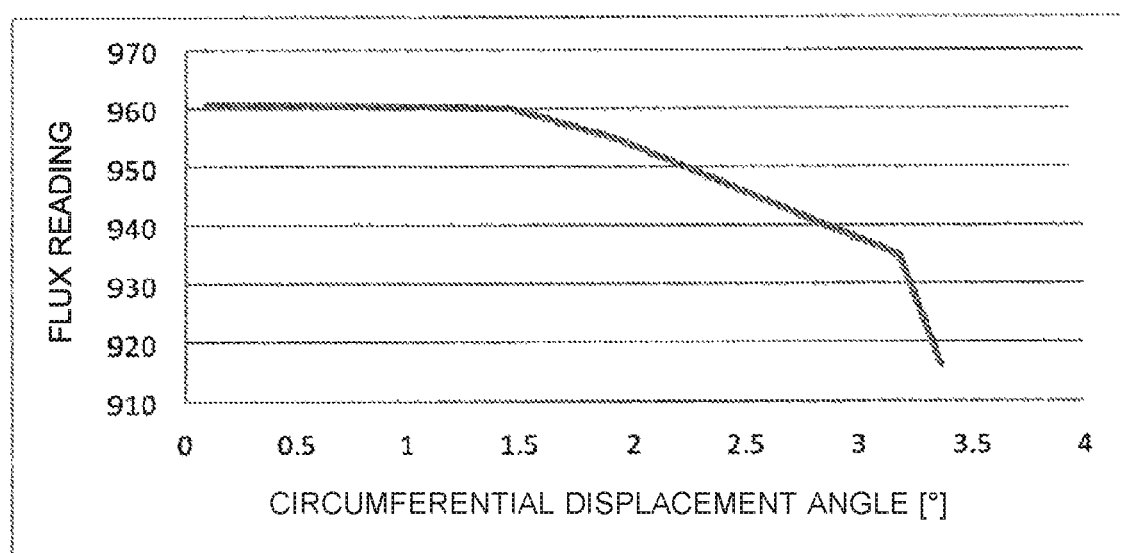
FIG. 10 is a graph illustrating the relationship between the flux reading of a rotor magnet, and the angle of circumferential displacement.

FIG. 10 is a graph illustrating the correlation between the flux reading of the rotor magnet 10, and the angle of circumferential displacement of the magnetic flux of the rotor magnet 10 from the poles of the magnetizing device 60 at the time of magnetization. Generally, the efficiency of magnetization decreases if a magnet is subjected to a magnetizing field displaced from the polarity orientation of the magnet. As illustrated in FIG. 10, the flux reading drops sharply from approximately 935 at circumferential displacement angles equal to or greater than 3.2 degrees. Therefore, it is desirable that the circumferential displacement angle of the rotor magnet 10 at the time of magnetization be less than 3.2 degrees. The flux reading when the magnetizing field is aligned with the polarity orientation is approximately 961, and the flux reading where there is a circumferential displacement of 1.5 degrees is approximately 960. Such a small difference in flux reading does not significantly affect performance, and the effect of correcting the measurement error of the molded stator 40 outweighs such a small difference in flux reading. Therefore, it is further desirable that the circumferential displacement angle of the rotor magnet 10 at the time of magnetization be equal to or greater than 0 degrees and less than 1.5 degrees. Although the flux reading varies with the measurement equipment, the flux reading is proportional to the flux count.

The manufacturing method according to Embodiment 3 uses the magnetizing device 60 in which the poles of the rotor-magnet magnetizing yoke 62 and the poles of the position-detecting-magnet magnetizing yoke 64 are equal in phase with each other. The angle of circumferential displacement of the rotor 20 is adjusted at the time of magnetization. This configuration allows the rotor 20 to be magnetized with a phase difference provided between the respective poles of the rotor magnet 10 and the position detecting magnet 11 of the rotor 20 by use of the magnetizing device 60 having a simple structure. The magnetizing device 60 according to Embodiment 3 has the structure illustrated in FIG. 9, which is simple compared to the structure illustrated in FIG. 6(*a*) and FIG. 6(*b*) that involves rotation of the rotor-magnet magnetizing yoke 62. Magnetizing yokes are consumables in general, and thus desired to have a structure that allows for low replacement cost, that is, a simple structure. The use of the magnetizing device 60 according to Embodiment 3 having a simple structure enables cost reduction. Further, the electric motor 100 including the rotor manufactured by the manufacturing method and the manufacturing apparatus according to Embodiment 3 can be driven with high efficiency and low noise.

A rotor of an electric motor can be assumed to have been manufactured by the manufacturing method and the manufacturing apparatus according to the present invention if, for example, a magnet viewer sheet is put on the rotor and the presence of a phase difference between the respective poles of the rotor magnet and the position detecting magnet is confirmed. Further, the present invention can be assumed to have been implemented also if the pattern of phase difference between poles differs between the rotors of a plurality of electric motors of the same model.

Reference Signs List

| | |
|---|---|
| 1 | rotor shaft |
| 2 | protrusion |
| 3 | seat |
| 4 | heat welding part |
| 10 | rotor magnet |
| 11 | position detecting magnet |
| 12 | heat welding part |
| 13 | recess |
| 14 | first end face |
| 15 | second end face |
| 20 | rotor |
| 21a, 21b | bearing |
| 30 | bracket |
| 40 | molded stator |
| 41 | molding resin part |
| 42 | stator |
| 43 | stator core |
| 44 | insulation |
| 45 | coil |
| 46 | board |
| 47 | magnetic detection element |
| 48 | shaft hole |
| 49 | hollow part |
| 50 | stator assembly |
| 51 | protrusion |
| 52 | hole |
| 53 | terminal |
| 54 | terminal insertion hole |
| 60 | magnetizing yoke |
| 61 | rotor-magnet magnetizing coil |
| 62 | rotor-magnet magnetizing yoke |
| 63 | position-detecting-magnet magnetizing coil |
| 64 | position-detecting-magnet magnetizing yoke |

The invention claimed is:

1. A device for manufacturing a rotor of an electric motor, the rotor including a rotor magnet and a position detecting magnet, the rotor magnet being disposed in a circumferential direction of a rotor shaft, the position detecting magnet being disposed side-by-side with the rotor magnet with respect to an axial direction of the rotor shaft, the device comprising two magnetizing yokes that each generate a magnetic field with unlike poles alternating in the circumferential direction, wherein a first magnetizing yoke of the two magnetizing yokes has a space in a shape of a cylinder, wherein a second magnetizing yoke of the two magnetizing yokes is disposed near one axial end portion of the cylinder of the first magnetizing yoke, wherein the first magnetizing yoke includes a rotor magnet magnetizing coil that is disposed on an outside of the space in a shape of the cylinder and that is configured to generate a first magnetic field for magnetizing the rotor magnet, wherein the second magnetizing yoke includes a position detecting magnet magnetizing coil that is disposed on a cylinder axis of the space in the shape of the cylinder and that is configured to generate a second magnetic field for magnetizing the position detecting magnet, and wherein the first magnetic field generated by the rotor magnet magnetizing coil of the first magnetizing yoke and the second magnetic field generated by the position detecting magnet magnetizing coil of the second magnetizing yoke have a phase difference relative to each other in the circumferential direction.

2. The device for manufacturing the rotor of the electric motor of claim 1, wherein the first magnetizing yoke is rotatable, either manually or by a rotational drive unit, in the circumferential direction.

3. The device for manufacturing the rotor of the electric motor of claim 1, wherein the first magnetizing yoke and the second magnetizing yoke generate the first and second magnetic fields, respectively, having the phase difference in an inclusive range between 1.5 degrees and 3.2 degrees.

4. The device for manufacturing the rotor of the electric motor of claim 1, wherein the first magnetizing yoke and the second magnetizing yoke generate the first and second magnetic fields, respectively, having the phase difference in an inclusive range between 0 degrees and 1.5 degrees.

5. The device for manufacturing the rotor of the electric motor of claim 1, wherein the first magnetic yoke generates the first magnetic field with a first direction, and the second magnetic yoke generates the second magnetic field generated with a second direction, the first direction and the second direction being orthogonal to each other.

6. The device for manufacturing the rotor of the electric motor of claim 1, wherein the first magnetic yoke generates the first magnetic field in a radial direction of the rotor magnet and the second magnetic yoke generates the second magnetic field in an axial direction of the position detecting magnet.

* * * * *